(12) United States Patent
Yang et al.

(10) Patent No.: US 10,183,664 B2
(45) Date of Patent: Jan. 22, 2019

(54) VEHICLE SYSTEM, BATTERY SYSTEM AND CONTROL METHOD THEREOF

(71) Applicant: Hyundai Motor Company, Seoul (KR)

(72) Inventors: Boram Yang, Gyeonggi-do (KR); Hyun Soo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/375,441

(22) Filed: Dec. 12, 2016

(65) Prior Publication Data

US 2018/0056983 A1 Mar. 1, 2018

(30) Foreign Application Priority Data

Aug. 30, 2016 (KR) ........................ 10-2016-0110845

(51) Int. Cl.
| | |
|---|---|
| *B60W 20/50* | (2016.01) |
| *B60W 20/13* | (2016.01) |
| *B60W 10/06* | (2006.01) |
| *B60W 10/08* | (2006.01) |
| *B60W 10/26* | (2006.01) |
| *B60L 3/00* | (2006.01) |
| *B60L 3/04* | (2006.01) |

(Continued)

(52) U.S. Cl.
CPC ........... *B60W 20/50* (2013.01); *B60L 3/0046* (2013.01); *B60L 3/04* (2013.01); *B60L 3/12* (2013.01); *B60L 11/1861* (2013.01); *B60W 10/06* (2013.01); *B60W 10/08* (2013.01); *B60W 10/26* (2013.01); *B60W 20/13* (2016.01); *H02J 7/007* (2013.01); *H02J 7/0029* (2013.01); *B60L 2240/545* (2013.01); *B60L 2240/547* (2013.01); *B60L 2240/549* (2013.01); *B60W 2510/244* (2013.01); *Y10S 903/93* (2013.01)

(58) Field of Classification Search
CPC .. B60L 3/0046; B60L 3/04; B60L 3/12; B60L 11/1861; B60L 2240/545; B60L 2240/547; B60L 2240/549; H02J 7/0029; H02J 7/007; Y10S 903/93; B60W 20/50; B60W 20/13; B60W 10/06; B60W 10/08; B60W 10/26; B60W 2510/244
USPC .......................................................... 701/22
See application file for complete search history.

(56) References Cited

U.S. PATENT DOCUMENTS

| | | | |
|---|---|---|---|
| 9,707,855 B1 * | 7/2017 | Wang ................... | B60L 11/1861 |
| 2005/0285445 A1* | 12/2005 | Wruck ....................... | H02J 1/14 307/10.1 |

(Continued)

FOREIGN PATENT DOCUMENTS

| | | | |
|---|---|---|---|
| JP | 2009-018695 A | 1/2009 | |
| JP | 2010-104175 A | 5/2010 | |

(Continued)

*Primary Examiner* — Tuan C To
(74) *Attorney, Agent, or Firm* — Mintz Levin Cohn Ferris Glovsky and Popeo, P.C.; Peter F. Corless

(57) ABSTRACT

A battery system is provided. The system includes a battery and a sensor unit having a voltage sensor that detects a voltage of the battery and a current sensor that detects a charging and discharging current of the battery. A power relay assembly of the system includes a main relay that connects between the battery and a vehicle system. Additionally, a battery management system (BMS) applies different diagnostic error code confirm conditions to the voltage sensor and the current sensor when a multi-error of the voltage sensor and the current sensor is detected.

15 Claims, 3 Drawing Sheets

(51) Int. Cl.
*B60L 3/12* (2006.01)
*H02J 7/00* (2006.01)
*B60L 11/18* (2006.01)

(56) References Cited

U.S. PATENT DOCUMENTS

| | | | | |
|---|---|---|---|---|
| 2010/0244847 | A1* | 9/2010 | Kudo | B60L 3/0046 324/433 |
| 2012/0256611 | A1* | 10/2012 | Fukui | B60L 3/003 323/304 |
| 2013/0049973 | A1* | 2/2013 | Matsumoto | B60L 3/0046 340/636.12 |
| 2013/0168499 | A1* | 7/2013 | Grossman | B64D 7/00 244/135 A |
| 2014/0240125 | A1* | 8/2014 | Burch | G08B 21/0213 340/539.13 |
| 2015/0084404 | A1* | 3/2015 | Hashim | B60L 11/18 307/9.1 |
| 2016/0207403 | A1* | 7/2016 | Iida | B60L 11/02 |
| 2016/0248317 | A1* | 8/2016 | Taguchi | H02M 1/32 |
| 2016/0303976 | A1* | 10/2016 | Cha | B60L 3/0046 |
| 2016/0318416 | A1* | 11/2016 | Kamatani | B60L 3/0046 |
| 2017/0008162 | A1* | 1/2017 | Tsubota | G05B 19/00 |
| 2017/0028867 | A1* | 2/2017 | Ishishita | B60L 11/1861 |
| 2017/0028868 | A1* | 2/2017 | Minamiura | B60L 11/1859 |
| 2017/0040925 | A1* | 2/2017 | Sakai | F04B 39/00 |
| 2017/0115370 | A1* | 4/2017 | Chang | B60L 11/1851 |
| 2017/0136914 | A1* | 5/2017 | Drake | H02J 7/1461 |
| 2017/0166182 | A1* | 6/2017 | Kim | B60W 10/02 |
| 2017/0197521 | A1* | 7/2017 | Park | B60L 11/1859 |
| 2017/0197607 | A1* | 7/2017 | Yamazaki | B60K 6/48 |
| 2017/0253140 | A1* | 9/2017 | Chang | B60L 11/1877 |
| 2018/0051598 | A1* | 2/2018 | Pedro | B60K 6/24 |

FOREIGN PATENT DOCUMENTS

| | | | |
|---|---|---|---|
| JP | 2013130448 A | * | 7/2013 |
| JP | 5393619 B2 | * | 1/2014 |
| KR | 20000021899 A | * | 4/2000 |
| KR | 10-2003-0055866 A | | 7/2003 |
| KR | 2009-0129212 A | | 12/2009 |
| KR | 2012-0079674 A | | 7/2012 |
| KR | 10-2013-0068419 A | | 6/2013 |
| KR | 10-2014-0062300 A | | 5/2014 |
| KR | 10-2014-0073949 A | | 6/2014 |

* cited by examiner

VEHICLE SYSTEM, BATTERY SYSTEM AND CONTROL METHOD THEREOF

CROSS-REFERENCE TO RELATED APPLICATION

This application claims priority to and the benefit of Korean Patent Application No. 10-2016-0110845 filed in the Korean Intellectual Property Office on Aug. 30, 2016, the entire contents of which are incorporated herein by reference.

BACKGROUND

(a) Field of the Invention

The present invention relates to a vehicle system, a battery system, and a control method thereof, and more particularly, to a vehicle system, battery system, and control method thereof that more effectively operates the battery by separately coping with a single error and a multi-error.

(b) Description of the Related Art

A battery management system (BMS) is a system that manages a battery mounted within an electric vehicle (EV), a hybrid electric vehicle (HEV), a plug-in hybrid electric vehicle (PHEV), or a fuel cell electric vehicle (FCEV). The battery management system is configured to measure a current, a voltage, and a temperature, or the like of a battery to adjust a state of charge (SOC), a state of discharge, a residual quantity, or the like of a high voltage battery. Further, the battery management system is configured to communicate with other control systems within the vehicle to control surrounding environment to create optimum environment for a battery. The battery management system also performs a trouble diagnosis (e.g., error diagnosis) on a battery and performs reactions corresponding to each detected trouble, thereby protecting vehicle systems. In particular, the battery management system performs a diagnosis on several components within the vehicle such as sensors, communications, and a power relay assembly (PRA), thereby diagnosing the error of the high voltage battery.

Meanwhile, a single error may occur in only one device but a multi-error may occur in two devices or more, while the battery management system performs the error diagnosis. Conventionally, the reactions corresponding to errors are individually applied to each device, and therefore even though multiple errors occur, the system has only been capable of handling the errors as a single error. However, it may be effective to perform reactions corresponding to the multi-errors, differently from the single error. Therefore a method for separately coping with a single error and a multi-error is required.

The above information disclosed in this section is merely for enhancement of understanding of the background of the invention and therefore it may contain information that does not form the prior art that is already known in this country to a person of ordinary skill in the art.

SUMMARY

The present invention provides a vehicle system, a battery system, and a control method thereof having advantages of effectively operating a battery by separately coping with a single error and a multi-error.

An exemplary embodiment of the present invention provides a battery system, that may include: a battery; a sensor unit having a voltage sensor configured to detect a voltage of the battery and a current sensor configured to detect a charging and discharging current of the battery; a power relay assembly having a main relay that connects between the battery and a vehicle system; and a battery management system (BMS) configured to apply different diagnostic error code confirm conditions to the voltage sensor and the current sensor when a multi-error of the voltage sensor and the current sensor is detected.

Another exemplary embodiment of the present invention provides a vehicle system, that may include: a battery management system configured to request a fail-safe cooperative control when a connection of a main relay connecting between a vehicle system and a battery is maintained, when a multi-error of a voltage sensor configured to detect a voltage of the battery and a current sensor configured to detect a charging and discharging current of the battery is detected; and a vehicle controller configured to adjust a charging and discharging torque of a motor based on a capacitor voltage of a high voltage line, when the fail-safe cooperative control is requested from the battery control system.

Yet another exemplary embodiment of the present invention provides a control method of a battery system, that may include: diagnosing a trouble (e.g., an error) of a voltage sensor configured to detect a voltage of a battery and a current sensor configured to detect a charging and discharging current of the battery; maintaining a main relay that connects between the battery and a vehicle system to be in an on state when a multi-error of the voltage sensor and the current sensor is detected; and requesting a fail-safe cooperative control to a vehicle controller to allow the vehicle controller in the vehicle system to adjust a charging and discharging torque based on a capacitor voltage of a high voltage line.

According to an exemplary embodiment of the present invention, it may be possible to more easily confirm error situations. Further, according to exemplary embodiment of the present invention, the battery may be more efficiently used by expanding the available environment of the battery to improve the fuel consumption.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SYMBOLS

Figure 1:
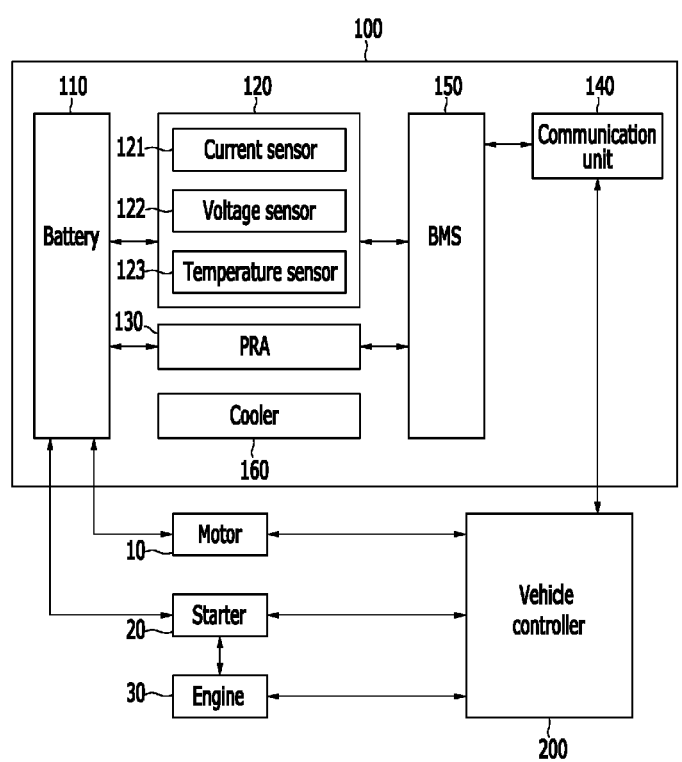
FIG. 1 is a diagram illustrating a battery system according to an exemplary embodiment of the present invention.

100: Battery system
110: Battery
120: Sensor unit
121: Current sensor
122: Voltage sensor 123: Temperature sensor
130: Power relay assembly
140: Communication unit
150: BMS

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that those skilled in the art to which the present invention pertains may easily practice the present invention. However, the present invention may be implemented in various different forms and is not limited to exemplary embodiments provided herein.

A part irrelevant to the description will be omitted to clearly describe the present invention, and the same or like elements will be designated by the same reference numerals throughout the specification. Throughout this specification and the claims that follow, when it is described that an element is "coupled" to another element, the element may be "directly coupled" to the other element or "electrically coupled" to the other element through a third element.

Hereinafter, a battery system and a control method thereof according to exemplary embodiments of the present invention will be described with reference to the accompanying drawings. In the present specification and claims, it is to be understood that a vehicle means a hybrid electric vehicle (HEV), a plug-in hybrid electric vehicle (PHEV), an electric vehicle (EV), or a fuel cell electric vehicle (FCEV) using power of a motor. Hereinafter, the hybrid electric vehicle will be mainly described, and since a technology of driving the plug-in hybrid electric vehicle, the electric vehicle, and the fuel cell vehicle by the motor is obvious to a person of ordinary skill in the art, a detailed description therefor will be omitted.

FIG. 1 is a diagram illustrating a battery system according to an exemplary embodiment of the present invention. Referring to FIG. 1, a battery system 100 may include a battery 110, a sensor unit 120, a power relay assembly (PRA) 130, a communication unit 140, a battery management system (BMS) 150, and a cooler 160. The various components may be operated by a controller having a memory and a processor.

The battery may be a secondary battery charged and discharged and may be a high voltage battery. The sensor unit 120 may include a plurality of sensors configured to detect a state of the battery 110. Particularly, the sensor unit 120 may include a current sensor 121 configured to detect a discharging current or a charging current of the battery 110, a voltage sensor 122 configured to detect a voltage of the battery 110, and a temperature sensor 123 configured to detect a temperature of the battery 110. Meanwhile, FIG. 1 illustrates as an example a case in which the sensor unit 120 includes the current sensor 121, the voltage sensor 122, and the temperature sensor 123, but the present invention is not limited thereto and therefore a type of sensor and the number of sensors included in the sensor unit 120 may be changed.

The power relay assembly (PRA) 130 is a relay assembly that connects the battery 110 and a vehicle system. The PRA 130 may be operated to be turned on and off by the BMS 150. The communication unit 140 may be configured to communicate with other controller (not illustrated) within the vehicle system in which the battery system 100 is mounted. For example, the communication unit 140 may be configured to communicate with a vehicle controller 200 (e.g., hybrid vehicle control unit (HCU)) that is an upper controller within the vehicle system. The communication unit 140 may specifically be configured to communicate with other controllers within the vehicle system by a controller area network (CAN) communication scheme.

The cooler 160 may be configured to adjust the temperature of the battery 110. The BMS 150 may specifically be configured to execute a general operation of the battery system 100. The BMS 150 may be performed by at least one central processing unit (CPU) or a processor that is implemented by other chipsets, a microprocessor, or the like. The BMS 150 may be configured to detect or acquire a current, a voltage, or the like of the battery 110 using the sensor unit 120 and calculate a state of charge (SOC) of the battery 110 based on the acquired current, voltage, or the like. The SOC may, for example, be calculated by dividing a residual capacity of the battery 110 by a rated capacity thereof and may be represented as a percentage (by % unit).

Furthermore, the BMS 150 may be configured to perform a power limit function of limiting charging power or discharging power of the battery 110 based on state information of the battery 110 and state information of the vehicle system in which the battery system 100 is mounted. The BMS 150 may be configured to calculate the state information of the battery 110 and an allowable maximum charging value or maximum discharging value of the battery 110 based on the state information of the vehicle system and may use the calculated value as a maximum power allowable value for power limitation.

In addition, the BMS 150 may be configured to turn the PRA 130 on and off. The BMS 150 may be configured to predict accidents such as an electric shock and a fire that may occur during an error, failure, or malfunction (e.g., trouble) of the battery system 100 or the vehicle system and prevent such accidents from proliferating, by turning the PRA 130 on and off. The BMS 150 may further be configured to perform an error diagnosis function of the battery system 100. The BMS 150 may be configured to monitor the sensor unit 120, the PRA 130, the communication unit 140, a cooler 160, or the like to diagnose the error of the battery system 100. When the error is detected, the BMS 150 may be configured to execute reacting control corresponding to errors (e.g., failed devices).

Meanwhile, when the BMS 150 performs the error diagnosis and the BMS 150 performs the same control regardless of a single error in which a failure is detected in a single device or communication or a multi-error in which a failure is detected in at least two devices or communications, the unnecessary control may be performed and thus, the efficiency of the battery system 100 may be reduced. Therefore, when the error is detected, the BMS 150 according to the exemplary embodiment of the present invention may be configured to determine whether the error is a single error or a multi-error and perform separate reactions based on the determination.

When the battery system 100 fails, the BMS 150 may be configured to generate a diagnostic trouble code (DTC) to detect error situations during vehicle maintenance. The DTC is a code that represents error occurrence such as a sensor measurement value associated with a driving state of the battery system 100 and error occurrence content when the failure occurs. The confirmed DTC may be stored in a memory (not illustrated) of the controller and may be accessed by a diagnosis apparatus for the purpose of later maintenance, or the like.

Moreover, the BMS 150 may be configured to determine whether to satisfy a DTC confirm condition to confirm the DTC when a failure or error occurs. The DTC confirmation in the BMS 150 may be divided into 1DC confirm or 2DC confirm. In particular, the DC is a driving cycle and corresponds to a cycle from a turn on of starting to a turn off. The 1DC confirm indicates that the corresponding DTC is confirmed when the error for the same devices continuously occurs for 1DC. Further, the 2DC confirm indicates that the corresponding DTC is confirmed when the error for the same device continuously occurs for 2DC.

Conventionally, as the DTC confirm conditions corresponding to each failed device, the fixed conditions have been used independent of whether the multi-error occurs or a single error occurs. However, according to the exemplary embodiment of the present invention, when the multiple errors occur, the DTC confirm condition applied at the time of the single error and the multi-error may be dualized to facilitate the error situation confirmation during the vehicle maintenance when the multi-error occurs.

Figure 2:
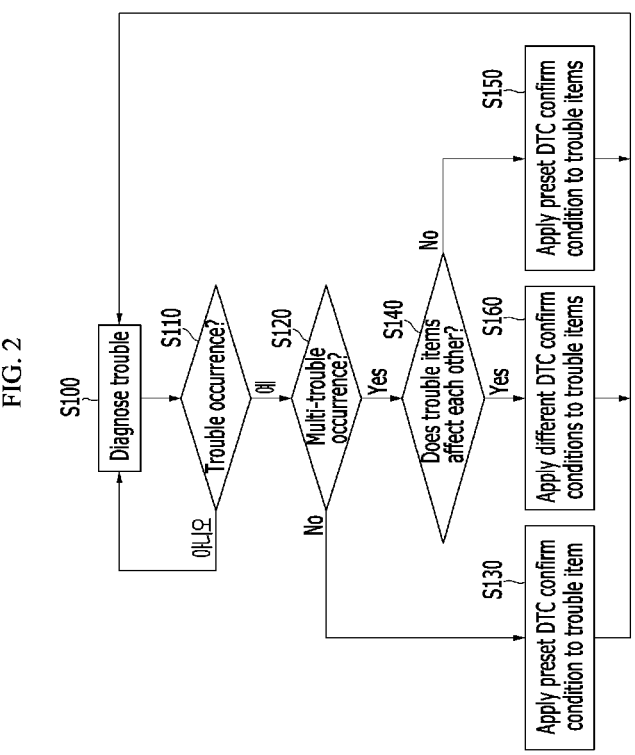
FIG. 2 is a diagram illustrating a control method of a battery system according to an exemplary embodiment of the present invention.

Hereinafter, a method for dualizing a DTC confirm condition applied during the single error and the multi-error will be described in detail with reference to FIG. 2. FIG. 2 is a diagram illustrating a control method of a battery system 100 according to an exemplary embodiment of the present invention and is a diagram illustrating a method for confirming a DTC when an error occurs. The control method of FIG. 2 may be performed by the BMS 150 in the battery system 100 (e.g., by a controller within the BMS) according to the exemplary embodiment of the present invention.

Referring to FIG. 2, the BMS 150 may be configured to monitor the sensor unit 120, the PRA 130, the communication unit 140, the cooler 160, or the like to diagnose the error or failure of the battery system 100 (S100). When the error occurrence is detected (S110), the BMS 150 may be configured to determine whether the single error for the single device or communication occurs or the multi-error occurs for at least two devices or communications (S120). In the step S120, when the single error occurs, the BMS 150 may be configured to apply the DTC confirm condition preset to correspond to an error device (e.g., a failed device) to confirm the DTC (S130). For example, when the error of the current sensor 121 is detected, the BMS 150 may be configured to apply the 2DC confirm preset to correspond to the current sensor 121. Therefore, the BMS 150 may be configured to confirm the corresponding DTC when the error of the current sensor 121 is continued for 2DC.

In response to determining in the step S120 that the multi-error occurs, the BMS 150 may be configured to determine whether error devices (e.g., failed devices) affect each other (S140). In other words, when the failed devices affect each other, the BMS 150 may be configured to determine whether the situations in which SOC estimation is impossible, the battery 110 is damaged, and vehicle security is threatened. In response to determining in the step S140 that the devices having the multi-error do not affect each other, the BMS 150 may be configured to apply the preset DTC confirm condition to the failed devices to confirm the DTC (S150). For example, when the error of the current sensor 121 and the temperature sensor 123 is detected, the current sensor 121 and the temperature sensor 123 do not affect each other, and therefore the BMS 150 may be configured to apply the preset 2DC confirm to each of the current sensor 121 and the temperature sensor 123. Therefore, the BMS 150 may be configured to confirm the DTC for the current sensor 121 and the temperature sensor 123, respectively, when an error is continued for 2DC.

In response to determining in the step S140 that the devices having the multi-error affect each other, the BMS 150 may be configured to apply different DTC confirm conditions to the failed devices to confirm the DTC (S160). For example, when both of the current sensor 121 and the voltage sensor 122 are diagnosed to be fail, the SOC estimation may be impossible. Therefore, the BMS may be configured to apply the 2DC confirm to the device first diagnosed to be in error among the current sensor 121 and the voltage sensor 122 and then apply the 1DC confirm to the device later diagnosed to be in error to confirm the DTC.

Further, when both of the temperature sensor 123 and the cooler 160 are diagnosed to be in error, the cooling control of the battery 110 may be impossible and thus the battery 110 may be damaged. Therefore, the BMS 150 may be configured to apply the 2DC confirm to one of the temperature sensor 123 and the cooler 160 first diagnosed to be in error and then apply the 1DC confirm to the device later diagnosed to be in error to confirm the DTC. Accordingly, when different DTC confirm conditions are applied to the devices having the multi-error, the error situations may be more easily confirmed using the DTC during the vehicle maintenance.

The battery system 100 may previously set a list of the error devices that affect each other to cause the situations in which the SOC estimation is impossible, the battery 110 is damaged, the vehicle security is threatened or the like and store the set list in a memory (not illustrated). In particular, the BMS 150 may be configured to perform the step S140 based on the pre-stored list.

Referring back to FIG. 1, the SOC is a factor during the control of the high voltage battery 110. The related art operates a main relay to be in an off state not to use the high voltage battery independent of the use possibility of the high voltage battery when the SOC estimation is impossible due to the error. Therefore, the use of the high voltage battery stops since the SOC estimation is impossible even when the high voltage battery may be used, and thus the available environment of the battery is reduced, which negative affects the fuel efficiency. Accordingly, in the exemplary embodiment of the present invention, the BMS 150 may be configured to maintain the main relay of the PRA 130 to be in an on state and support the use of the battery 110 based on the fail-safe cooperative control with other controllers, even when the SOC estimation is impossible.

Figure 3:
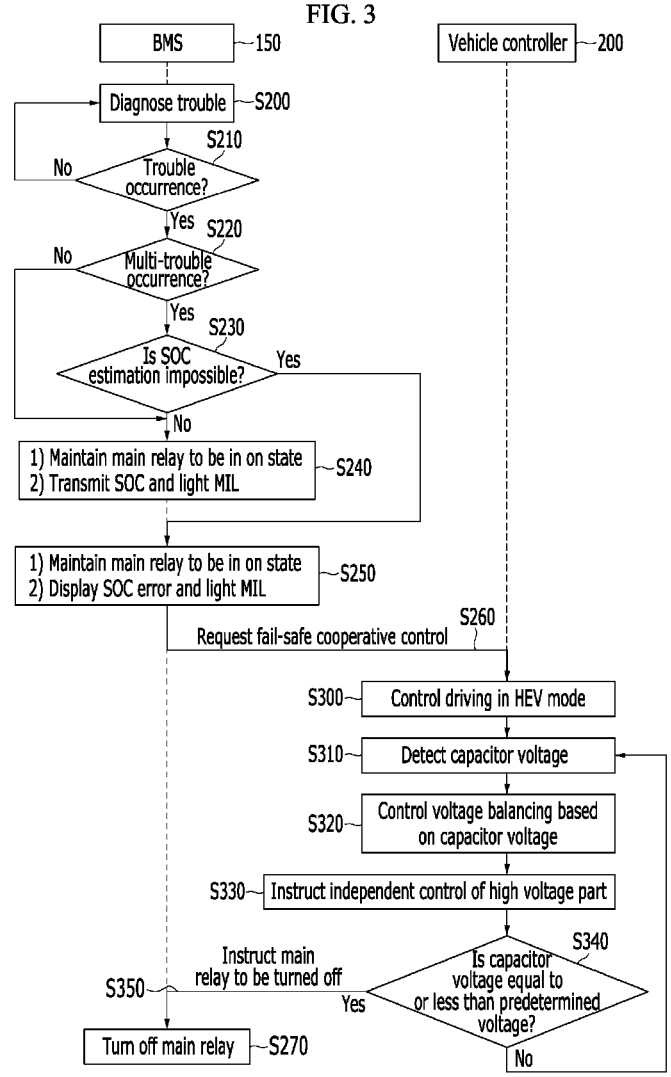
FIG. 3 is a diagram illustrating a method for performing a fail-safe cooperative control with a vehicle controller in a battery control system according to an exemplary embodiment of the present invention.

Hereinafter, referring to FIG. 3, a method for performing a fail-safe cooperative control between the BMS 150 and other controllers even when the SOC estimation is impossible due to the multi-error will be described in detail. FIG. 3 is a diagram illustrating a method for controlling a fail-safe cooperative control with a vehicle controller within a battery control system according to an exemplary embodiment of the present invention. Referring to FIG. 3, the BMS 150 may be configured to monitor the sensor unit 120, the PRA 130, the communication unit 140, the cooler 160, or the like that configures the battery system 100 to diagnose the error of the battery system 100 (S200).

When a failure or error occurrence is detected (S210), the BMS 150 may be configured to determine whether the single error for the single device or communication occurs or the multi-error for at least two devices or communications occurs (S220). In the step S220, when the single error occurs, the BMS 150 may be configured to maintain the main relay of the PRA 130 to be in an on state without performing the fail-safe cooperative control with other controllers. Further, the SOC may be transmitted to other controllers within the vehicle system via the communication unit 140 and a malfunction indicator lamp (MIL) may be turned on to provide a warning regarding error situations (S240).

In response to determining that the multi-error occurs, the BMS 150 may be configured to determine whether the SOC estimation is impossible due to the multi-error (S230). For example, when the error of the current sensor 121 and the voltage sensor 122 is detected and thus the sensor value for the SOC estimation may not be acquired, the BMS 150 may be configured to determine that the SOC estimation is impossible. In response to determining that the SOC estimation is possible even though the multi-error occurs, the BMS 150 may be configured to maintain the main relay of the PRA 130 to be in an on state without performing the fail-safe cooperative control with other controllers. Further, the SOC may be transmitted to other controllers via the communication unit 140 and the malfunction indicator lamp (MIL) may be turned on to provide a warning regarding the error situations (S240).

For example, when the error of the current sensor 121 and the temperature sensor 123 is detected as a multi-error, the SOC estimation may be made by the voltage sensor 122. Therefore, the BMS 150 may be configured to maintain the main relay of the PRA 130 to be in an on state and transmit the SOC to other controllers via the communication unit. Further, the malfunction indicator lamp (MIL) may be turned on to provide a warning regarding error situations (S240). In response to determining that the SOC estimation is impossible, the BMS 150 may be configured to maintain the main relay of the PRA 130 to be in an on state, display the SOC error via the communication unit 140, and turn on the MIL to provide a notification regarding the error situations (S250). Further, the BMS may be configured to request the fail-safe cooperative control to the other controllers (e.g., vehicle controller 200) (S260).

In the step S250, the BMS 150 may be configured to display an SOC error ID or a final SOC reference fixed value to display the SOC error. In the step S260, the BMS 150 may be configured to transmit the SOC error ID, or the like to the vehicle controller 200 via the communication unit 140 to request the fail-safe cooperative control to the vehicle controller 200. The vehicle controller 200 may be configured to detect that the SOC estimation is impossible and operate a vehicle to be driven in a hybrid electric vehicle (HEV) mode using a torque of a motor 10 as auxiliary power while using a torque of an engine 30 as main power (S300). Particularly, the vehicle controller 200 may be configured to start the engine 30 to drive the engine 30 when the engine 30 is not being driven.

Additionally, the vehicle controller 200 may be configured to detect a capacitor voltage of a high voltage line using a motor controller unit (MCU) or a low voltage direct current-direct current (DC-DC) converter (LDC) (S310) and perform a voltage balancing control using the detected capacitor voltage (S320). For example, the vehicle controller 200 may be configured to adjust a charging and discharging torque of a motor 10 or a starter 20 based on the capacitor voltage of an inverter. When the fail-safe cooperative control based on the SOC estimation impossibility is requested from the BMS 150, the vehicle controller 200 may be configured to operate high voltage parts such as the MCU, the LDC, and an oil pump unit (OPU) to be independently driven (S330). For example, the vehicle controller 200 may be configured to operate the LDC to perform an independent control based on a voltage input from the high voltage line.

Meanwhile, while the vehicle controller 200 performs the fail-safe cooperative control with the BMS 150, the vehicle controller 200 may be configured to continuously monitor whether the capacitor voltage is decreased to be equal to or less than a predetermined voltage (S340) and in response to determining that the capacitor voltage is decreased to be equal to or less than the predetermined voltage, the vehicle controller 200 may be configured to transmit a control signal to the BMS 150 to turn off the main relay of the PRA 130 (S350). In response to receiving the control signal, the BMS 150 may be configured to turn off the main relay of the PRA 130 to block the connection between the battery 110 and the vehicle system (S270). According to the exemplary embodiment of the present invention, due to the SOC estimation impossibility of the battery 110, when the vehicle controller 200 uses the capacitor voltage to perform the voltage balancing control, the predetermined voltage that is a reference for turning off a main relay may be set in consideration of specifications of the battery 110, specifications of other controllers, or the like.

As described above, according to the exemplary embodiment of the present invention, the main relay may be maintained in the on state by the fail-safe cooperative control of the BMS 150 and other controllers (e.g., vehicle controller 200) even when the SOC estimation of the battery 110 is impossible due to the multi-error. As a result, the battery may be more efficiently used by expanding the available environment of the battery to improve the fuel consumption.

The control method of a battery system according to the exemplary embodiment of the present invention may be executed by software. When the control method is executed by the software, components of the present invention are code segments executing required operations. Programs or code segments may be stored in a non-transitory computer readable medium.

The accompanying drawings and the detailed description have not been used in order to limit the meaning or limit the scope of the present invention stated in the claims, but have been used only in order to illustrate the present invention. Therefore, those skilled in the art may easily perform selection and replacement therefrom. Further, those skilled in the art may omit components without reducing performance of some of the components described in the present specification or add components to improve performance. In addition, those skilled in the art may change an order of steps of a method described in the present specification depending on process environment or equipment. Therefore, the scope of the present invention is to be defined by the accompanying claims and their equivalences rather than the embodiments described above.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A battery system, comprising:
   a battery;
   a sensor unit including a voltage sensor configured to detect a voltage of the battery and a current sensor configured to detect a charging and discharging current of the battery;
   a power relay assembly including a main relay that connects between the battery and a vehicle system; and
   a battery management system (BMS) configured to apply different diagnostic error code confirm conditions to the voltage sensor and the current sensor when a multi-error of the voltage sensor and the current sensor is detected,
   wherein the battery management system is configured to maintain the main relay to be an on state when the multi-error of the voltage sensor and the current sensor is detected and request a fail-safe cooperative control to a vehicle controller to adjust a charging and discharging torque of a motor based on a capacitor voltage of a high voltage line.

2. The battery system of claim 1, wherein the battery management system is configured to turn off the main relay when the capacitor voltage is decreased to be equal to or less than a predetermined voltage.

3. The battery system of claim 1, wherein the battery management system is configured to diagnose an error of devices configuring the battery system and apply different diagnostic error code confirm conditions between the errored devices when the multi-error occurs in a plurality of devices and the errored devices affect each other, and wherein the devices configuring the battery system include the sensor unit.

4. The battery system of claim 3, further comprising:
   a temperature sensor configured to detect a temperature of the battery; and
   a cooler configured to adjust the temperature of the battery,
   wherein the battery management system is configured to apply different diagnostic error code confirm conditions to the temperature sensor and the cooler when a multi-error of the temperature sensor and the cooler is detected.

5. The battery system of claim 3, wherein the battery management system is configured to determine whether devices having a multi-error affect each other, based on a list of the error devices that affect each other at the time of the error.

6. The battery system of claim 3, wherein the battery management system is configured to apply a 2 driving cycle (2DC) confirm to a device first diagnosed to be in error among the devices having the multi-error to confirm a diagnostic error code and apply a single driving cycle (1DC) confirm to a device later diagnosed to be in error to confirm the diagnostic error code.

7. A vehicle system, comprising:
   a battery management system configured to request a fail-safe cooperative control when a connection of a main relay that connects between a vehicle system and a battery is maintained, when a multi-error of a voltage sensor that detects a voltage of the battery and a current sensor that detects a charging and discharging current of the battery is detected; and
   a vehicle controller configured to adjust a charging and discharging torque of a motor based on a capacitor voltage of high voltage line, when the fail-safe cooperative control is requested from the battery control system.

8. The vehicle system of claim 7, wherein the vehicle controller is configured to output a control signal to the battery management system to turn off the main relay when the capacitor voltage is decreased to be equal to or less than a predetermined voltage while adjusting the charging and discharging torque based on the capacitor voltage.

9. The vehicle system of claim 7, wherein the vehicle controller is configured to operate an engine of the vehicle system to allow the vehicle system to be driven in a hybrid electric vehicle (HEV) mode in response to receiving a request of the fail-safe cooperative control.

10. The vehicle system of claim 7, wherein the vehicle controller is configured to start an engine in response to receiving a request of the fail-safe cooperative control while the engine stops.

11. A control method of a battery system, comprising:
    diagnosing, by a battery management system, an error of a voltage sensor that detects a voltage of a battery and a current sensor that detects a charging and discharging current of the battery;
    maintaining, by the battery management system, a main relay that connects between the battery and a vehicle system to be in an on state when a multi-error of the voltage sensor and the current sensor is detected; and
    requesting, by the battery management system, a fail-safe cooperative control to a vehicle controller to adjust a charging and discharging torque of a motor based on a capacitor voltage of a high voltage line.

12. The control method of claim 11, further comprising:
    turning off, by the battery management system, the main relay when the capacitor voltage is decreased to be equal to or less than a predetermined voltage.

13. The control method of claim 11, further comprising:
confirming, by the battery management system, a diagnostic error code for the voltage sensor and the current sensor of which the multi-error is detected.

14. The control method of claim 13, wherein the confirming of the diagnostic error code includes:
confirming, by the battery management system, the diagnostic error code by applying different diagnostic code confirm conditions to the voltage sensor and the current sensor.

15. The control method of claim 13, wherein the confirming of the diagnostic trouble code includes:
confirming, by the battery management system, the diagnostic error code by applying a 2 driving cycle (2DC) confirm to a device first diagnosed to be in error among the voltage sensor and the current sensor; and
confirming, by the battery management system, the diagnostic error code by applying a single driving cycle (1DC) confirm to a device later diagnosed to be in error among the voltage sensor and the current sensor.

* * * * *